TWO-PORT NETWORK FOR REALIZING TRANSFER FUNCTIONS

Filed Dec. 29, 1966 2 Sheets-Sheet 1

INVENTOR
S. K. MITRA
BY Leonard A. Arnold
ATTORNEY

Sept. 10, 1968 S. K. MITRA 3,401,352

TWO-PORT NETWORK FOR REALIZING TRANSFER FUNCTIONS

Filed Dec. 29, 1966 2 Sheets-Sheet 2

United States Patent Office 3,401,352

Patented Sept. 10, 1968

3,401,352
TWO-PORT NETWORK FOR REALIZING TRANSFER FUNCTIONS

Sanjit K. Mitra, Old Bridge, N.J., assignor to Bell Telephone Laboratories, Incorporated, Murray Hill, N.J., a corporation of New York Filed Dec. 29, 1966, Ser. No. 605,683
3 Claims. (Cl. 330—99)

The present invention contemplates a two-port network using four R-C two-terminal networks and two grounded amplifiers in a configuration which has a transfer function which is the ratio of the differences of driving point admittances so that general transfer functions may be realized using grounded practical amplifiers while avoiding the use of negative impedance converters, inductors, and crystals.

The development of circuitry to realize general transfer functions without the use of crystals or inductors has taken place along two lines. In the first line of development the circuitry developed employs negative impedance converters which are not only expensive but are difficult to realize under practical conditions. In the second line of development amplifiers have been employed but the circuits utilized have been unable to compensate for any characteristics of the amplifier which differ from its ideal characteristics.

It is an object of this invention to compensate for the non-ideal characteristics of a practical (non-ideal) amplifier in circuitry for deriving general transfer functions.

In accordance with this invention a two port active network capable of generating the general transfer functions $$t_I=\frac{Y_A-\mu Y_B}{Y_1+Y_A-\alpha Y_2}$$

$$t_v=\frac{Y_A-\mu Y_B}{Y_A+Y_B+Y_1-\alpha Y_2}$$

comprises two basic sections. The first section employs a grounded amplifier having a gain $(1+\alpha)$ and R-C driving point circuits having admittances $Y_1$ and $Y_2$ serving as a shunt across the input of the amplifier and a feedback circuit respectively. The second section which is either connected in parallel or cascaded with the first, depending on whether a current or voltage transfer function is to be generated, consists of a grounded amplifier having a gain $-\mu$ and two R-C driving point circuits having admittances $Y_B$ and $Y_A$ connected in that order in series between the output and the input of the second amplifier with the output of the second section taken at the common junction of the two R-C circuits. The resulting circuitry provides for easy compensation for the non-ideal characteristics of practical amplifiers, has no limit on the maximum effective gain and imposes no restriction on the transfer functions. This latter feature is most important since it permits the realization of positive real transmission zeroes thereby permitting realization of all pass functions of odd order. Finally circuitry embodying this invention utilizes one port, or two terminal, R-C networks which makes the circuitry easy to build.

This invention will be more fully comprehended from the following detailed description taken in conjunction with the drawings in which.

and

Figures 5, 6:
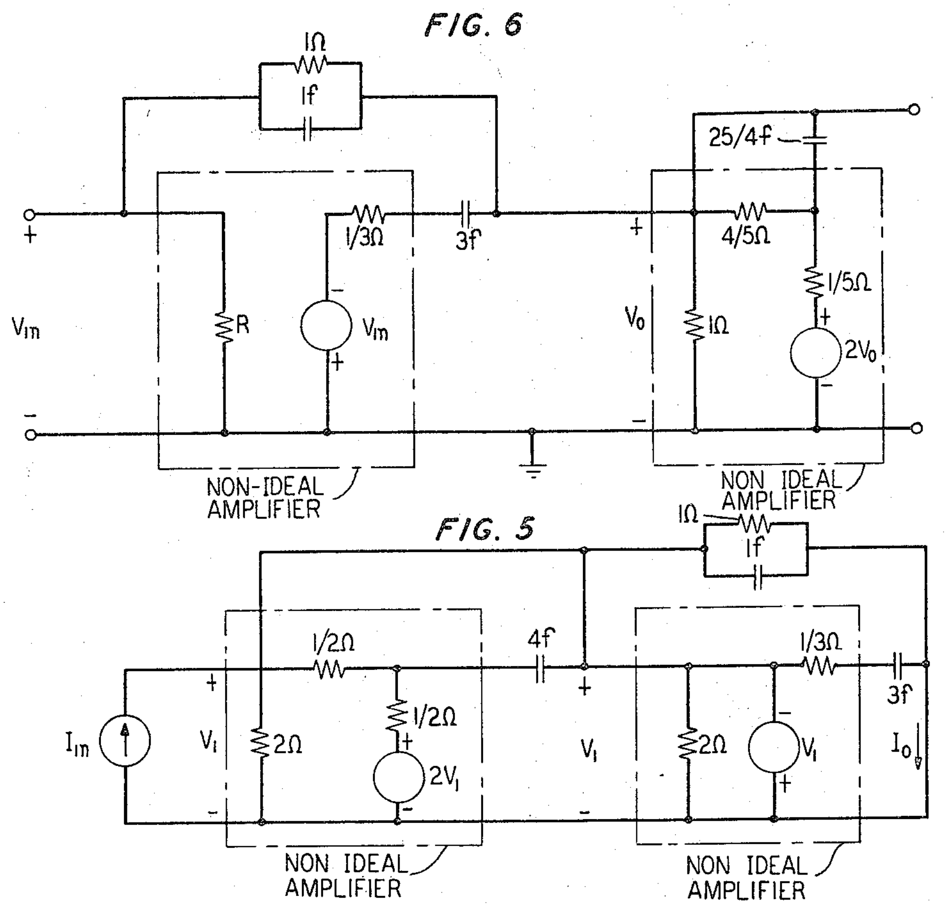
FIG. 5 is a schematic diagram of a circuit embodying this invention for generating the current transfer function $$t_I=\frac{S^2-S+1}{S^2+S+1}$$

FIG. 6 is a schematic diagram of a circuit embodying this invention for generating the voltage transfer function $$t_v=\frac{S^2-S+1}{S^2+S+1}$$

In order to understand the operation of general transfer function circuitry embodying this invention it is first necessary to analyze portions of such circuitry. Consider the circuit shown in FIG. 1, wherein a voltage amplifier 10 having a gain $1+\alpha$, two input terminals 11 and 12, and an output terminal 13, has an R-C admittance 14 connected in parallel with the input of the amplifier, and an R-C admittance 15 connected between the output 13 and the input 11. The current $I_3$ going through $Y_2$ in the direction shown is $$(V_1-V_2)Y_2 \tag{1}$$

where $V_2$ is the output voltage, $V_1$ is the input voltage, and $Y_2$ is the admittance of circuit 15. The input current at input terminal 17 is $$I_1=Y_1V_1+(V_1-V_2)Y_2 \tag{2}$$

and $$V_2=(1+\alpha)V_1 \tag{3}$$

where $1+\alpha$ is the voltage gain of amplifier 10.

Thus $$I_1=Y_1V_1+[V_1-(1+\alpha)V_1]Y_2 \tag{4}$$

or $$I_1=V_1(Y_1-\alpha Y_2) \tag{5}$$

and $$\left.\frac{V_1}{I_1}\right|_{I_2=0}=\frac{1}{Y_1-\alpha Y_2} \tag{6}$$

Similary it may be shown that $$\left.\frac{V_2}{I_1}\right|_{I_2=0}=\frac{\alpha+1}{Y_1-\alpha Y_2} \tag{7}$$

Figure 2:
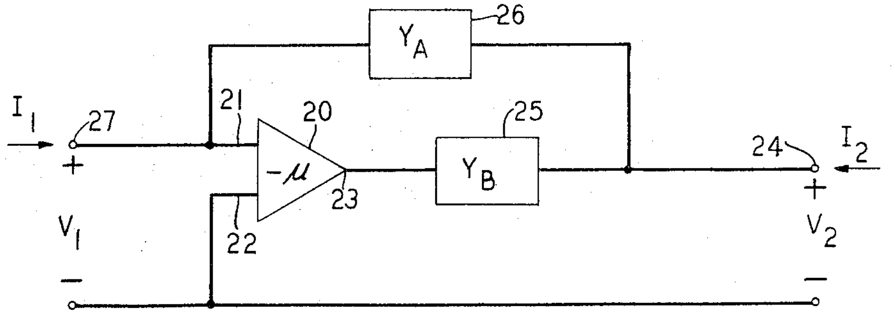
FIG. 2 is a second section of a general transfer function circuit embodying this invention.

Another portion of the general transfer function circuitry utilizing this invention is shown in FIG. 2. It comprises an amplifier 20 having two input terminals 21 and 22 and an output terminal 23. Connected between amplifier output terminal 23 and the output terminal 24 of the circuit is an R-C circuit 25, and another R-C circuit 26 is connected between circuit input terminal 27 and circuit output terminal 24. Analysis similar to that shown above yields $$-Y_{21}=\left.\frac{-I_2}{V_1}\right|_{V_2=0}=Y_A-\mu Y_B \tag{8}$$

where $-\mu$ is the voltage gain of amplifier 23, and $Y_A$ and $Y_B$ are the admittances of circuits 26 and 25 respectively.

In accordance with this invention a two port network using R-C two terminal networks and two grounded amplifiers for realizing general current transfer functions is obtained by connecting the input terminals of the above described networks in parallel, connecting an input current source 30 between ground and terminal 17, and providing a direct connection between terminal 24 and ground for the output current. The resulting circuit is shown in block diagram form in FIG. 3.

Summing currents at terminal 21, $$I_{in}=Y_1V_1+[V_1-(1+\alpha)V_1]Y_2+V_1Y_A \quad (9)$$

$$I_{in}=[Y_1+Y_2+Y_A-(1+\alpha)Y_2]V_1$$

$$I_{in}=[Y_1+Y_A-\alpha Y_2]V_1 \quad (10)$$

Summing currents at terminal 24

$$V_1Y_A+(-\mu V_1)Y_B=I_O \quad (11)$$

or $$I_O=(Y_A-\mu Y_B)V_1 \quad (12)$$

Dividing Equation 12 by Equation 10, $$\frac{I_O}{I_{in}}=\frac{Y_A-\mu Y_B}{Y_1+Y_A-\alpha Y_2} \quad (13)$$

Figure 3:
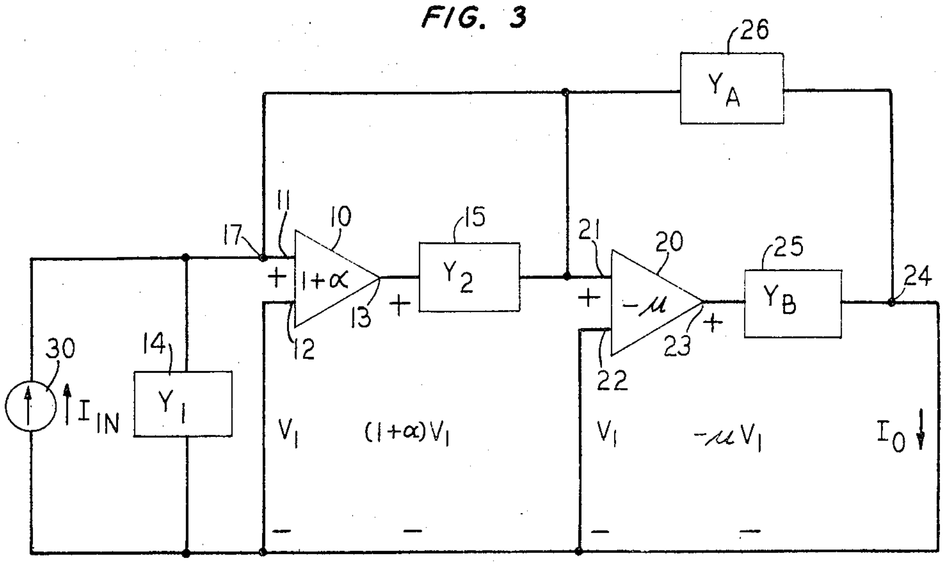
FIG. 3 is a block diagram of a circuit embodying this invention for generating current transfer functions.

As is known in the art, in order for a circuit to be capable of realizing general current transfer functions its transfer function $t_I(s)$ must be expressible in the following form $$t_I(s)=\frac{Y_a(s)-Y_b(s)}{Y_c(s)-Y_d(s)} \quad (14)$$

where $Y_a(s)$, $Y_b(s)$, $Y_c(s)$ and $Y_d(s)$ are passive R-C driving-point admittances. Comparison of Equations 13 and 14 shows that the circuit embodying this invention shown in FIG. 3 is capable of generating general current transfer functions.

Figure 1:
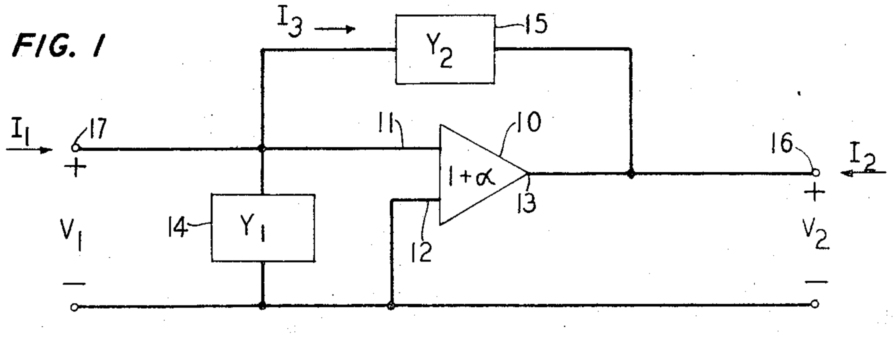
FIG. 1 is a first section of a general transfer function circuit embodying this invention.
Figure 4:
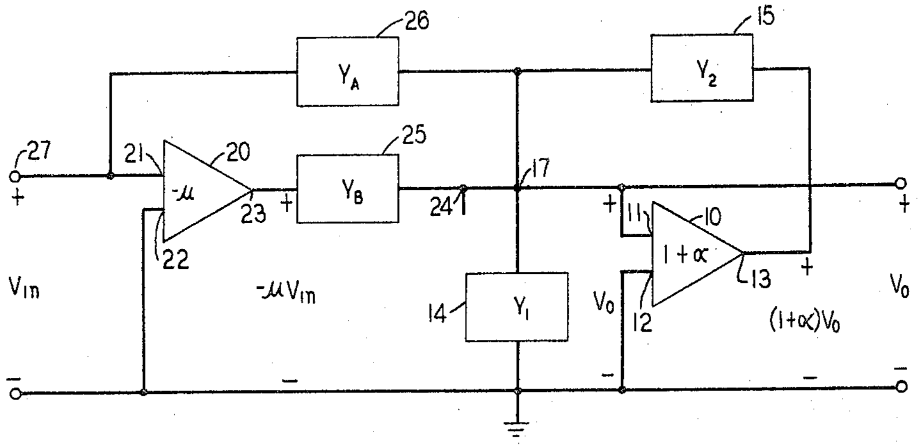
FIG. 4 is a block diagram of a circuit embodying this invention for generating voltage transfer functions.

A second embodiment of this invention for generating general voltage transfer functions is obtained by cascading the circuits of FIGS. 1 and 2 to produce the circuit shown in FIG. 4. Here the output terminal 24 of the circuit shown in FIG. 2 is connected to the input terminal 17 of the circuit shown in FIG. 1.

Summing currents at node 17, $$(-\mu V_{in}-V_O)Y_B+(V_{in}-V_O)Y_A=Y_1V_O+[V_O-(1+\alpha)V_O]Y_2 \quad (15)$$

or $$V_{in}[-\mu Y_B+Y_A]-V_O[Y_B+Y_A]=V_O[Y_1-\alpha Y_2] \quad (16)$$

or $$(Y_A-\mu Y_B)V_{in}=(Y_A+Y_B+Y_1-\alpha Y_2)V_O \quad (17)$$

$$\therefore\ t_v=\frac{V_O}{V_{in}}=\frac{Y_A-\mu Y_B}{Y_A+Y_B+Y_1-\alpha Y_2} \quad (18)$$

As before, for the realization of a general voltage transfer function, the voltage ratio of a circuit must be expressible as $$t_v(s)=\frac{Y_1(s)-Y_2(s)}{Y_3(s)-Y_4(s)} \quad (19)$$

where $Y_1(s)$, $Y_2(s)$, $Y_3(s)$, and $Y_4(s)$ are passive R-C driving-point admittance functions. Equation 18 is in the form specified by Equation 19 and the circuitry of FIG. 4 is therefore capable of realizing general voltage transfer functions, which are real rational functions.

It should be noted that in order to realize a general voltage or current transfer function $N(s)/D(s)$ that function must be expressed in the form of Equation 14 or 18, respectively. This can be achieved in the following way. Choose a polynominal $Q(s)$, having distinct negative real roots (no root at $s=0$) and satisfying the following degree requirement:

Degree of $Q(s)+1\geq$ max. [degree of $N(s)$, degree of $D(s)$], rewrite $N(s)/D(s)$ as $$\frac{N(s)}{D(s)}=\frac{N(s)/Q(s)}{D(s)/Q(s)} \quad (20)$$

Since $N(s)/sQ(s)$ has distinct negative real poles, a partial fraction expansion of $N(s)/sQ(s)$ will in general be of the following form:

$$\frac{N(s)}{sQ(s)}=\left(k_\infty+\frac{k_0}{s}+\sum_i\frac{k_i}{s+\sigma_i}\right)-\left(h_\infty+\frac{h_0}{s}+\sum_j\frac{h_j}{s+\sigma_j}\right) \quad (21)$$

where the residues in the expansion $k_\infty$, $k_0$, $k_1$, $h_\infty$, $h_0$, and $h_j$ are real and non-negative. Thus $N(s)/Q(s)$ can be expressed $$\frac{N(s)}{Q(s)}=\left(k_\infty s+k_0+\sum_i\frac{k_is}{s+\sigma_i}\right)-\left(h_\infty s+h_0+\sum_j\frac{h_js}{s+\sigma_j}\right) \quad (22)$$

$$=Y_a(s)-Y_b(s) \quad (23)$$

where $$Y_a(s)=k_\infty s+k_0+\sum_i\frac{k_is}{s+\sigma_i} \quad (24)$$

$$Y_b(s)h={}_\infty s+h_0+\sum_j\frac{h_js}{s+\sigma_j}$$

It is seen that $Y_a(s)$ and $Y_b(s)$ are guaranteed to be passive R-C driving-point admittances. In a like manner, $D(s)/Q(s)$ can be expressed as the difference of two passive R-C driving-point admittances, that is, $$\frac{D(s)}{Q(s)}=Y_c(s)-Y_d(s) \quad (26)$$

where $Y_c(s)$ and $Y_d(s)$ are passive R-C driving-point admittance functions.

A specified current transfer ratio $t_I(s)=N(s)/D(s)$ can be realized using the circuit shown in FIG. 3 as follows. Choose a $Q(s)$ having all distinct negative real roots (with no root at $s=0$) and satisfying the degree requirement of Equation 14. First, $$t_I=\frac{N(s)}{D(s)}=\frac{N(s)/Q(s)}{D(s)/Q(s)} \quad (27)$$

As shown above $N(s)/Q(s)$ and $D(s)/Q(s)$ can be expressed as the difference of R-C driving point admittances. Therefore $$\frac{N(s)}{Q(s)}=Y_{RC}^{(1)}-Y_{RC}^{(2)} \quad (28)$$

$$\frac{D(s)}{Q(s)}=Y_{RC}^{(3)}-Y_{RC}^{(4)} \quad (29)$$

or $$t_I=\frac{Y_{RC}^{(1)}-Y_{RC}^{(2)}}{Y_{RC}^{(3)}-Y_{RC}^{(4)}} \quad (30)$$

Comparing Equation 30 with Equation 13 the following terms are easily identified:

$$Y_A=Y_{RC}^{(1)} \quad (31)$$

$$Y_B=\frac{1}{\mu}Y_{RC}^{(2)} \quad (32)$$

$$Y_1=Y_{RC}^{(3)}+G \quad (33)$$

$$Y_2=\frac{1}{\alpha}[Y_{RC}^{(4)}+Y_{RC}^{(1)}+G] \quad (34)$$

and $Y_A$, $Y_B$, $Y_1$, and $Y_2$ are R-C driving-point admittances. It should be observed that the above identification is not unique.

A specific example of this technique aids in further understanding of circuitry embodying the invention. Assume that it is desired to have the circuit shown in FIG. 3 realize the transfer function, $$t_I=\frac{N(s)}{D(s)}=\frac{s^2-s+1}{s^2+s+1} \quad (35)$$

A suitable $Q(s)$ is $$Q(s)=s+1 \quad (36)$$

A partial fraction expansion of $N(s)/sQ(s)$ and $D(s)/sQ(s)$ yields $$\frac{N(s)}{sQ(s)}=\frac{s^2-s+1}{s(s+1)}=1+\frac{1}{s}-\frac{3}{s+1} \quad (37)$$

$$\frac{D(s)}{sQ(s)}=\frac{s^2+s+1}{s(s+1)}=1+\frac{1}{s}-\frac{1}{s+1} \quad (38)$$

Hence $$\frac{N(s)}{Q(s)}=(s+1)-\left(\frac{3s}{s+1}\right) \quad (39)$$

$$\frac{D(s)}{Q(s)}=(s+1)-\left(\frac{s}{s+1}\right) \quad (40)$$

Comparison of Equations 28, 29, 39, and 40 yields $$Y_{RC}^{(1)}=s+1 \quad (41)$$

$$Y_{RC}^{(2)}=\frac{3s}{s+1} \quad (42)$$

$$Y_{RC}^{(3)}=s+1 \quad (43)$$

$$Y_{RC}^{(4)}=\frac{s}{s+1} \quad (44)$$

Substituting the above results in Equations 31 through 34 and assuming $\alpha$ and $\mu$ to be unity then without any loss of generality the following is obtained $$Y_A=Y_{RC}^{(1)}=s+1 \quad (45)$$

$$Y_B=\frac{1}{\mu}Y_{RC}^{(2)}=\frac{3s}{s+1} \quad (46)$$

$$Y_1=Y_{RC}^{(3)}+G=s+1+G \quad (47)$$

$$Y_2=\frac{1}{\alpha}[Y_{RC}^{(4)}+Y_{RC}^{(1)}+G]=\frac{s}{s+1}+s+1+G \quad (48)$$

In Equation 47, G is chosen to be a positive and real constant to compensate for the input impedance of the amplifiers by making $Y_1(0)$ a positive real constant. Note that $Y_1(0)$ is a constant even if G is equal to zero. Choosing G equal to zero, the following identifications are made:

$$Y_A=s+1 \quad (49)$$

$$Y_B=\frac{3s}{s+1} \quad (50)$$

$$Y_1=s+1 \quad (51)$$

$$Y_2=\frac{s}{s+1}+s+1 \quad (52)$$

It should be noted that passive R-C admittances can be either subtracted or added to both $Y_1$ and $Y_2$ without affecting the overall current transfer function. This can be used to advantage in minimizing the total number of passive components in the final realization. Subtracting $s$ from $Y_1$ and $Y_2$ the following identifications can be made:

$$Y_A=s+1 \quad (53)$$

$$Y_B=\frac{3s}{s+1} \quad (54)$$

$$Y_1=1 \quad (55)$$

$$Y_2=\frac{s}{s+1}+1=\frac{2s+1}{s+1} \quad (56)$$

Since $Y_A=s+1$, $Y_A$ may be realized by the parrallel connection of a 1 ohm resistor and a 1 farad capacitor. Since $$Y_B=\frac{3s}{s+1}=\frac{1}{\frac{1}{3}+\frac{1}{3s}}$$

$Y_B$ may be realized by the series connection of a ⅓ ohm resistor and 3 farad capacitor. Similarly, since $Y_1=1$, $Y_1$ may be realized by a 1 ohm resistor or two 2 ohm resistors in parallel. Finally, since $$Y_2=\frac{2s+1}{s+1}$$

then $$Z_2=\frac{s+1}{2s+1}=\frac{1}{2}+\frac{\frac{1}{2}}{2s+1}=\frac{1}{2}+\frac{1}{4s+2}$$

and $Y_2$ may be realized by the series connection of a ½ ohm resistor with the parallel combination of a ½ ohm resistor and a 4 farad capacitor. The resulting circuit is shown in FIG. 5.

The above synthesis technique may be applied to the circuit of FIG. 4. For example, assume that it is desired to derive the voltage transfer ratio $$t_v=\frac{N(s)}{D(s)}=\frac{s^2-s+1}{s^2+s+1} \quad (57)$$

Let $Q(s)=(s+1)$ so that $$t_v=\frac{N(s)/Q(s)}{D(s)/Q(s)}=\frac{\frac{s^2-s+1}{s+1}}{\frac{s^2+s+1}{s+1}}=\frac{(s+1)-\left(\frac{3s}{s+1}\right)}{(s+1)-\left(\frac{s}{s+1}\right)} \quad (58)$$

Let $\mu=\alpha=1$, then comparing Equation 58 with Equation 18

$$Y_A=(s+1) \quad (59)$$

$$Y_B=\left(\frac{3s}{s+1}\right) \quad (60)$$

$$Y_1=0 \quad (61)$$

$$Y_2=\left(\frac{4s}{s+1}\right) \quad (62)$$

In general, practical voltage amplifiers have finite input, and output, impedances. As a result it is necessary to account for these impedances. As a result it is necessary to account for these impedances by letting $Y_1$ be a constant and adding its value to that of $Y_2$. Thus for the above example $$Y_1=1 \quad (63)$$

$$Y_2=\frac{4s}{s+1}+1=\frac{5s+1}{s+1} \quad (64)$$

Since $Y_A=s+1$, $Y_A$ may be realized by the parallel combination of a 1 ohm resistor and one farad capacitor. Since $$Y_B=\frac{3s}{s+1}$$

$Y_B$ may be realized by a series circuit comprising a ⅓ ohm resistor and a three farad capacitor. Similarly since $Y_1=1$, $Y_1$ may be realized by a one ohm resistor. Finally $Y_2$ may be realized by a circuit comprising the parallel combination of a ⅘ ohm resistor and a 25/4 farad capacitor, this parallel combination being in series with a ⅕ ohm resistor. This latter circuit realizes admittance $Y_2$ because $$Y_2=\frac{5s+1}{s+1}$$

and $$Z_2=\frac{s+1}{5s+1}=\frac{1}{5}+\frac{1}{\frac{25}{4}s+\frac{5}{4}}$$

The resulting circuit is shown in FIG. 6.

In accordance with this invention non-ideal amplifiers may be employed in circuitry for generating general transfer functions. Thus in the circuitry shown in FIG. 3, $Y_1$ can be used to compensate for the input impedance of amplifiers 10 and 20. In addition $Y_2$ can be used to compensate for the non-ideal characteristics of the feedback and output impedances of amplifier 10 while $Y_B$ compensates for the non-ideal characteristics of amplifier 20. Similarly, with respect to the circuitry shown in FIG. 4, $Y_B$ is utilized to compensate for the output impedance of amplifier 20, while $Y_1$ and $Y_2$ are utilized to compensate for the input, output and feedback impedances of amplifier 10.

Both the circuits of FIGS. 3 and 4 have another feature. Examining Equations 13 and 18 it is noted that the zeros and poles of the overall transfer function can be controlled independently by changing the gain of the inverting and non-inverting amplifiers. The gain of the amplifiers can be varied by varying the resistors in the feedback network. This is attractive from the point of view of integrated circuit realization, where it is easier to vary resistors than capacitors. The independent variability of the poles and zeros can be used to design variable frequency filters and compensating networks.

Thus in accordance with this invention both current and voltage transfer functions are realizable without the necessity of employing negative impedance converters. In addition the non-ideal characteristics of the amplifiers employed may be compensated for and grounded amplifiers may be employed.

It is to be understood that the above described arrangements are merely illustrative of the appreciation of the principles of the invention. Numerous other arrangements may be devised by those skilled in the art without departing from the spirit and scope of the invention.

What is claimed is:

1. An active two-port network comprising, in combination, a first section comprising two input terminals and two output terminals a first of each of said terminals being connected to ground, a first amplifier having a gain $1+\alpha$, two input terminals and an output terminal, a first of said first amplifier input terminals being connected to said second of said first section input terminals and the second of said amplifier input terminals being connected to ground, means connecting said amplifier output terminal to the second output terminal of said first section, an R-C network having an admittance $Y_1$ connected across said input terminals of said first amplifier, a second R-C circuit having an admittance $Y_2$ connected between said first section input and output terminals, a second section having two input terminals and two output terminals a first of said terminals being connected to ground, a second amplifier having a gain $-\mu$, two input terminals and an output terminal a first of said second amplifier input terminals being connected to said second of said second section input terminals and the second of said second amplifier input terminals being connected to ground, an R-C circuit having an admittance $Y_B$ connected between the output of said second amplifier and the second output terminal of said second section, an R-C circuit having an admittance $Y_A$ connected between said second output terminal of said second section and the second input terminal of said second section, and means interconnecting the ports of said sections so that a general transfer function is generated.

2. An active two-port network comprising, in combination, a first amplifier having a gain $1+\alpha$, two input terminals and an output terminal a first of said amplifier input terminals being connected to ground, a current source connected between the second input terminal of said first amplifier and ground, a second amplifier having a gain $-\mu$, two input terminals and an output terminal a first of said second amplifier input terminals being connected to ground, a first two terminal R-C circuit having an admittance $Y_2$ connected between the output of said first amplifier and the second input terminal of said second amplifier, a second two terminal R-C circuit having an admittance $Y_1$ connected between the second input terminal of said first amplifier and ground, a direct connection between the second input terminals of said amplifiers, a third two-terminal R-C circuit having an admittance $Y_B$ a first of said terminals of said third R-C circuit being connected to the output terminal of said second amplifier and the second of said terminals of said third R-C circuit being connected to ground, and a fourth two-terminal R-C circuit having an admittance $Y_A$ connected between the second terminal of said third R.C. circuit and the second input terminal of said second amplifier so that the current transfer function of the resulting circuit is $$t_I=\frac{I_O}{I_{in}}=\frac{Y_A-\mu Y_B}{Y_1+Y_A-\alpha Y_2}$$

where the output current $I_O$ is the current in the path connecting said second terminal of said third R-C circuit to ground and the input current $I_{in}$ is the current supplied by said current source.

3. An active two-port network comprising, in combination, a pair of network input terminals and a pair of network output terminals, a first of said network input terminals and a first of said network output terminals being connected to ground, a first amplifier having a gain of $-\mu$, a pair of input terminals a first of which is connected to the second network input terminal, and an output terminal, a second amplifier having a gain $1+\alpha$, a pair of input terminals a first of which is connected to ground and the second of which is connected to said second output terminal of said network, a first R-C circuit having an admittance $Y_B$ connected between the output of said first amplifier and the second input terminal of said second amplifier, a feedback circuit comprising the series connection of second and third two-terminal R-C circuits having admittances $Y_A$ and $Y_2$ respectively connected between the output of said second amplifier and the input of said first amplifier, and a fourth R-C network having an admittance $Y_1$ connected between the junction of said second and third networks so that the transfer function of the resulting circuit is $$t_V=\frac{Y_A-\mu Y_B}{Y_A+Y_B+Y_1-\alpha Y_2}$$

References Cited

UNITED STATES PATENTS

| | | | |
|---|---|---|---|
| 2,998,580 | 8/1961 | Sipress | 333—80 |
| 3,045,194 | 7/1962 | Sandberg | 333—80 |

ROY LAKE, *Primary Examiner.*

JAMES B. MULLINS, *Assistant Examiner.*